Sept. 25, 1934.  V. C. SHAH  1,975,024
BUFFER FOR THE PICKERS OR DRIVERS OF POWER LOOMS
Filed March 15, 1934
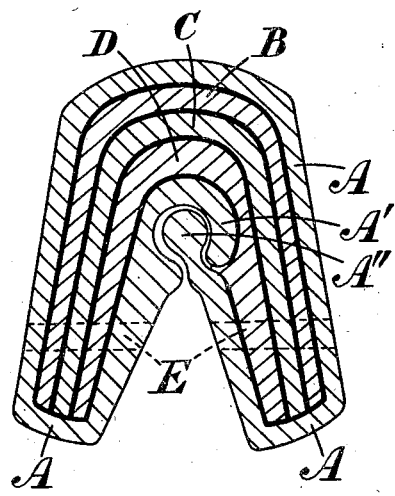
INVENTOR
V. C. Shah Patented Sept. 25, 1934

1,975,024

UNITED STATES PATENT OFFICE 1,975,024

BUFFER FOR THE PICKERS OR DRIVERS OF POWER LOOMS

Virembhai Chaturbhai Shah, Bombay, India

Application March 15, 1934, Serial No. 715,730
In British India November 14, 1932

2 Claims. (Cl. 139—166)

This invention relates to a buffer for the pickers or drivers of power looms, of the kind comprising superposed layers of hide, leather or like relatively pliable material moulded or otherwise formed into the desired shape, the outermost layer entirely surrounding the inner layer or layers.

Heretofore the superposed layers have been stitched or joined together by lacing and/or metal cramps so as to form a solid unit, but the buffers are then liable to rapid disintegration as the laces or cramps become loose by the knocks and strains during the process of picking and break away into fragments and injure the yarn or fabric.

The present invention provides a buffer of the above kind without any lacing or metal cramps, in that the ends of the outermost layer are so formed that they interlock with one another and securely hold the superposed layers together.

In one arrangement according to the invention one end of the outermost layer is hook-shaped and the other end formed with an enlarged or head portion adapted to engage the said hook-shaped end.

The accompanying drawing shows a sectional view of a buffer according to the invention.

The buffer is formed by first placing the layers A, B, C, D of hide, leather or the like together and then moulding or forming them into the shape shown in the drawing. E, E are holes in the legs of the buffer for the buffer spindle. The end of the outer layer A is hook-shaped at A' while the other end thereof is provided with a knob or head A''. The outer layer A forms a binding belt for the inner layers and the whole is formed into a solid unit when the knob A'' is locked into the hook A' as shown in the drawing.

Thus a buffer is constructed according to this invention in which the layers of hide, or leather, or the like, are held firmly together without the use of lacing or metal cramps.

I claim:—

1. A buffer for the pickers or drivers of power looms, comprising separate superposed layers of relatively pliable material moulded or otherwise formed into the desired shape, the outermost layer entirely surrounding the inner layer or layers, characterized in that the ends of the outermost layer are interlocked with one another and securely hold the superposed layers together.

2. A buffer as claimed in claim 1, characterized in that one end of the outermost layer is hook-shaped and the other end formed with an enlarged or head portion adapted to engage the said hook-shaped end.

VIREMBHAI CHATURBHAI SHAH.